United States Patent
Huang

(10) Patent No.: US 7,471,239 B1
(45) Date of Patent: Dec. 30, 2008

(54) METHODS FOR PROCESSING EXTERNAL CORRECTION MESSAGES, CORRECTING POSITION MEASUREMENTS OF GNSS RECEIVER, AND RELATED APPARATUSES

(75) Inventor: Kung-Shuan Huang, Changhua County (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 11/766,089

(22) Filed: Jun. 20, 2007

(51) Int. Cl.
*G01S 5/02* (2006.01)
(52) U.S. Cl. .............................. 342/357.03; 342/357.13
(58) Field of Classification Search ............ 342/357.03, 342/357.05, 357.06, 357.13; 701/213, 215
See application file for complete search history.

(56) References Cited

U.S. PATENT DOCUMENTS

| | | | |
|---|---|---|---|
| 5,563,607 A * | 10/1996 | Loomis et al. ......... 342/357.03 |
| 6,212,475 B1 * | 4/2001 | France et al. ................ 701/214 |
| 6,229,478 B1 * | 5/2001 | Biacs et al. ............ 342/357.03 |
| 6,490,524 B1 * | 12/2002 | White et al. ................ 701/215 |
| 6,704,652 B2 * | 3/2004 | Yi .............................. 701/214 |

* cited by examiner

*Primary Examiner*—Dao L Phan
(74) *Attorney, Agent, or Firm*—Winston Hsu

(57) ABSTRACT

Methods and apparatuses for processing external correction messages in a GNSS receiver are provided. One of the proposed methods includes providing a first storage unit; receiving a plurality of external correction messages from different data sources, wherein a plurality of GNSS differential correction data are carried by the plurality of external correction messages; and storing a portion of the GNSS differential correction data in the first storage unit without storing remaining GNSS differential correction data in the GNSS receiver.

40 Claims, 3 Drawing Sheets

METHODS FOR PROCESSING EXTERNAL CORRECTION MESSAGES, CORRECTING POSITION MEASUREMENTS OF GNSS RECEIVER, AND RELATED APPARATUSES

BACKGROUND

The present invention relates to global navigation satellite systems (GNSS), and more particularly, to methods for processing external correction messages, correcting position measurements of a GNSS receiver, and related apparatuses.

The global navigation satellite systems (GNSS), such as Global Position System (GPS), Galileo, or GLONASS, are widely used in many applications. A GNSS receiver can determine its position by receiving and analyzing coded signals transmitted from a plurality of orbiting satellites. The GNSS receiver computes the difference between the time a satellite transmits its signal and the time that the GNSS receiver receives the signal. The GNSS receiver then calculates its distance, or "pseudo-range," from the satellite in accordance with the time difference. Using the pseudo-ranges from at least four satellites, the GNSS receiver can determine its three-dimensional position (i.e., latitude, longitude, and altitude).

Unfortunately, the GNSS receiver has potential position errors due primarily to a variety of unintended sources, such as ionosphere and troposphere delays, receiver clock error, satellite orbit drift (a.k.a. ephemeris errors), etc. Most of the errors are "common errors" that are experienced by all the GNSS receivers in a local area.

To improve the accuracy of position measurement of the GNSS receiver, differential global positioning systems (DGPS) were developed. Conventional DGPS uses a stationary GNSS receiver at a known location as a reference station. The reference station measures satellite signal error by comparing its known position with the position measurement derived from the received satellite signals, and then transmits GNSS differential correction information (e.g., timing error measurements) to GNSS receivers within the area covered by the reference station. The GNSS differential correction information is applied to the position calculations of the GNSS receivers so that the GNSS receivers can get a more accurate position measurement.

A well-known example of DGPS is the Radio Technical Commission for Maritime (RTCM) Service provided by the U.S. Coast Guard. Generally, the GNSS receiver can receive GNSS differential correction data carried by the RTCM messages from a beacon, Internet, or through an RS232 cable.

The Satellite Based Augmentation System (SBAS) is another source of GNSS differential correction data. There are several types of SBAS, such as the Wide Area Augmentation System (WAAS) of North America, the Canada-Wide DGPS Correction Service (CDGPS) of Canada, the Multi-Functional Satellite Augmentation System (MSAS) of Japan, and the European Geostationary Navigation Overlay Service (EGNOS) of Europe. The SBAS satellites broadcast SBAS messages containing GNSS differential correction data to GNSS receivers within the coverage area of the SBAS satellites. The GNSS receivers with SBAS capabilities are capable of using the GNSS differential correction data carried by the SBAS messages to correct the GNSS satellite signal errors.

In addition to the RTCM and SBAS, some cellular communication systems (e.g., GSM) can also be utilized as a source of GNSS differential correction data. For example, a GSM base station can directly transmit A-GPS messages containing GNSS differential correction data to GNSS receivers with A-GPS capabilities through a wireless network.

As described previously, there are many sources of GNSS differential correction data. However, the data format and contents are different from each other. If a GNSS receiver wants to support multiple types of the GNSS differential correction data, considerable amounts of memory are required, thereby significantly increasing the hardware cost.

SUMMARY OF THE INVENTION

It is therefore an objective of the present disclosure to provide methods and apparatuses for processing external correction messages to reduce the memory requirement, and associated methods and apparatuses for correcting position measurements of a GNSS receiver.

An exemplary embodiment of a method for processing external correction messages in a GNSS receiver is disclosed comprising: providing a first storage unit; receiving a plurality of external correction messages from different data sources, wherein a plurality of GNSS differential correction data are carried by the plurality of external correction messages; and storing a portion of the GNSS differential correction data in the first storage unit without storing remaining GNSS differential correction data in the GNSS receiver.

An exemplary embodiment of a GNSS receiver is disclosed comprising: a first storage unit; a receiving module for receiving a plurality of external correction messages from different data sources, wherein a plurality of GNSS differential correction data are carried by the plurality of external correction messages; and a decision unit, coupled to the receiving module and the first storage unit, for storing a portion of the GNSS differential correction data in the first storage unit without storing remaining GNSS differential correction data in the GNSS receiver.

An exemplary embodiment of a method for correcting position measurements of a GNSS receiver is disclosed comprising: providing a first storage unit; receiving a plurality of external correction messages from different data sources, wherein a plurality of GNSS differential correction data are carried by the plurality of external correction messages; storing a portion of the GNSS differential correction data in the first storage unit without storing remaining GNSS differential correction data in the GNSS receiver; and modifying at least one of a pseudo-range measurement and a Doppler measurement of the GNSS receiver according to the GNSS differential correction data stored in the first storage unit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . " Also, the term "couple" is intended to mean either an indirect or direct electrical connection. Accordingly, if one device is coupled to another device, that connection may be through a direct electrical connection, or through an indirect electrical connection via other devices and connections.

Figure 1:
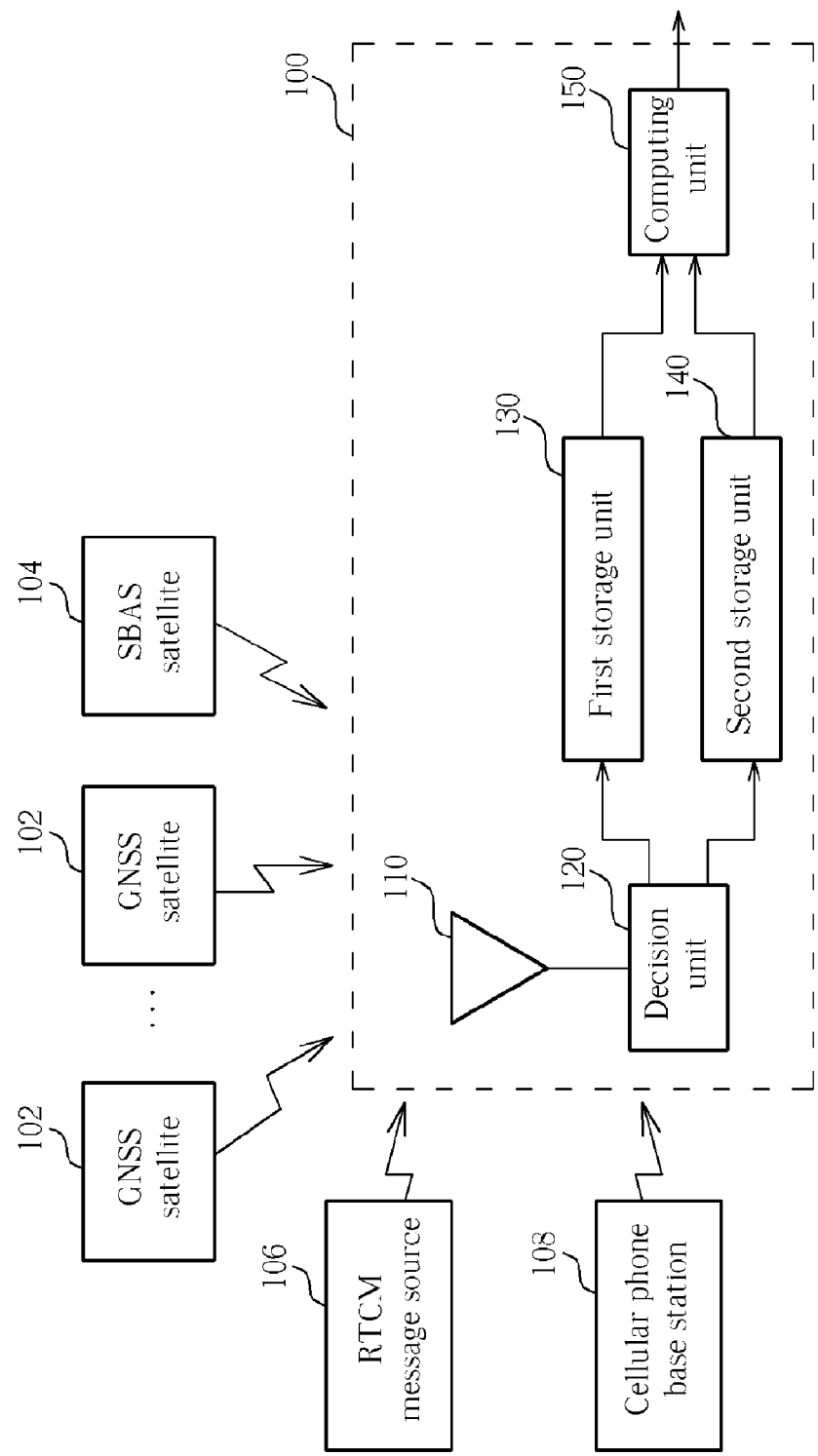
FIG. 1 is a simplified block diagram of a global navigation satellite system (GNSS) receiver according to an exemplary embodiment.

Please refer to FIG. 1, which shows a simplified block diagram of a global navigation satellite system (GNSS) receiver 100 (e.g., a GPS receiver) according to an exemplary embodiment. The GNSS receiver 100 comprises a receiving module 110, a decision unit 120, a first storage unit 130, a second storage unit 140, and a computing unit 150. The first and second storage units 130 and 140 may be separate memory devices or different sections of a same memory module. The receiving module 110 is arranged for receiving GNSS signals from a plurality of observable GNSS satellites (such as GPS satellites) denoted as 102, and for receiving a plurality of external correction messages transmitted from different data sources, such as a SBAS satellite 104, an RTCM message source 106, and a cellular phone base station 108 shown in FIG. 1. As in the foregoing descriptions, GNSS differential correction data are carried by the external correction messages.

Note that the term "external correction message" as used herein encompasses various signals or data transmitted from a data source to the GNSS receiver 100. The term "GNSS differential correction data" as used herein encompasses various signals or information for improving the accuracy of position measurements of the GNSS receiver 100. Additionally, the external correction messages derived from different data sources are usually different in terms of format and/or contents.

For example, the SBAS satellite 104 may be a WAAS satellite, a MSAS satellite, an EGNOS satellite, or any other satellite that continuously broadcasts SBAS messages carrying GNSS differential correction data from space. In case of the WAAS satellite, the GNSS differential correction data carried by the WAAS messages include message types 1 through 7, 10, 18, and 24 through 26. Note that the number of the SBAS satellite is not limited to one as illustrated in FIG. 1.

In practice, the RTCM message source 106 may be an RTCM beacon for broadcasting RTCM messages carrying GNSS differential correction data (such as message types 1, 2, and 9) on a particular radio frequency, but this is merely an example rather than a restriction of the practical implementations. For example, since the RTCM messages can be retrieved form the Internet, the RTCM message source 106 may be an access point and the receiving module 110 can retrieve the RTCM messages on the Internet from the access point by adopting wireless means. Alternatively, the receiving module 110 may be coupled to a mobile device (e.g. a laptop computer, a cellular phone, etc.) that capable of retrieving the RTCM messages from the Internet using wireless means. In this case, the receiving module 110 can receive the RTCM messages from the mobile device through a RS232 cable or other communication interfaces, so the mobile device can be regarded as an RTCM message source for the GNSS receiver 100.

In addition, the cellular phone base station 108 shown in FIG. 1 may be a GSM base station or a base station of any other cellular communication system that capable of transmitting A-GPS messages containing GNSS differential correction data to the GNSS receiver 100 through a wireless network.

The aforementioned SBAS messages, RTCM messages, and A-GPS messages are merely some examples of the external correction messages rather than restrictions of the practical implementations. In other words, the external message sources are not limited to those illustrated in FIG. 1.

In operations, the receiving module 110 receives GNSS signals from each observable GNSS satellite 102. The decision unit 120 stores GNSS data carried by the received GNSS signals in the second storage unit 140. Then, the computing unit 150 calculates position measurements (such as a pseudo-range measurement and a Doppler measurement) for the GNSS receiver 100 according to the GNSS data stored in the second storage unit 140. The way to calculate a position measurement for the GNSS receiver 100 according to the GNSS signals is well known in the art, and further details are omitted herein for brevity. Hereinafter, the operations of processing the external correction messages will be explained in detail with reference to FIG. 2 and FIG. 3.

Figure 2:
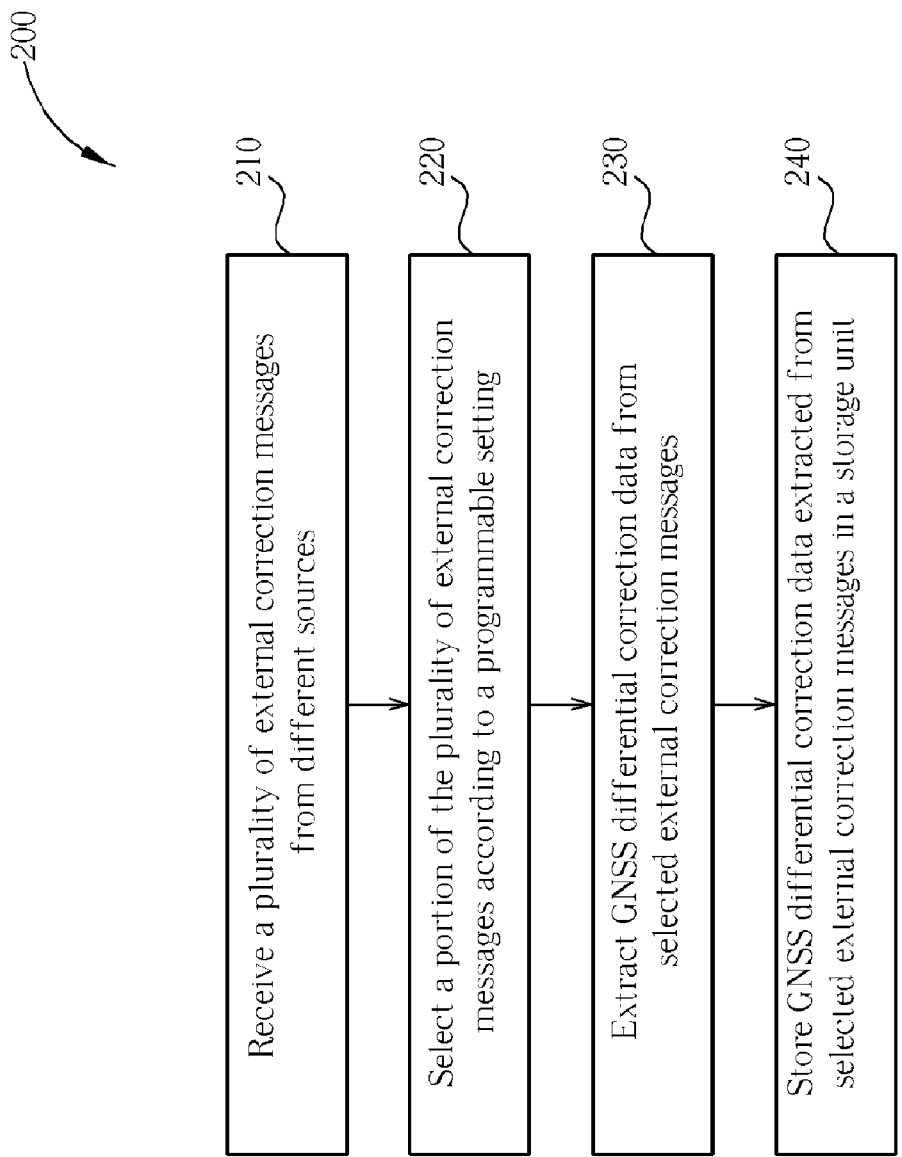
FIG. 2 is a flowchart illustrating a method for processing the external correction messages in the GNSS receiver of FIG. 1 according to a first embodiment of the present invention.

FIG. 2 is a flowchart 200 illustrating a method for processing the external correction messages in the GNSS receiver 100 according to a first embodiment of the present invention. Steps of the flowchart 200 are described below.

In step 210, the receiving module 110 receives a plurality of external correction messages from different sources, wherein GNSS differential correction data of different types are carried by the plurality of external correction messages. In this embodiment, the receiving module 110 receives SBAS messages, RTCM messages, and A-GPS messages from the SBAS satellite 104, the RTCM message source 106, and the cellular phone base station 108, respectively. In practice, the implementations of the receiving module 110 may vary with the formats and number of the external correction messages to be supported by the GNSS receiver 100.

Although there are many data sources of GNSS differential correction data, and the data format and contents are different from each other. Nevertheless, some GNSS differential correction data derived from different data sources have common functionalities, such as to correct the pseudo-range measurement and/or the Doppler measurement of the GNSS receiver 100. Accordingly, if the GNSS differential correction data derived from a data source is stored in the first storage unit 130, then remaining GNSS differential correction data derived from other data sources that have the same functionalities can be discarded to reduce the memory requirement.

Therefore, in step 220, the decision unit 120 selects a portion of the plurality of external correction messages according to a programmable setting (not shown). Preferably, the decision unit 120 selects external correction messages that are derived from a predetermined data source according to the programmable setting in step 220. In practice, a user of the GNSS receiver 100 is allowed to switch/select the source of GNSS differential correction data by changing the programmable setting.

In step 230, the decision unit 120 extracts GNSS differential correction data from the selected external correction messages.

Then, the decision unit 120 performs step 240 to store the GNSS differential correction data extracted from the selected external correction messages in the first storage unit 130 while discarding GNSS differential correction data carried by the other external correction messages. In a preferred embodiment, the first storage unit 130 is designed to have a capacity that is merely sufficient to store GNSS differential correction data derived from a predetermined data source, wherein the data amount of the GNSS differential correction data derived from the predetermined data source is greater than that derived from the other data sources. For example, suppose that the SBAS satellite 104 is a WAAS satellite, the first storage unit 130 may be designed to have a capacity that is merely sufficient to store GNSS differential correction data derived from the WAAS satellite 104. Since the data amount of the GNSS differential correction data transmitted from the WAAS satellite 104 is greater than that of the GNSS differential correction data transmitted from the RTCM message source 106 or the cellular phone base station 108, the first storage unit 130 can instead be used to store GNSS differential correction data derived from the RTCM message source 106 or the cellular phone base station 108.

In one aspect, the decision unit 120 functions as a memory controller and the first storage unit 130 functions as a shared memory.

When the GNSS differential correction data extracted from the selected external correction messages are stored in the first storage unit 130, the computing unit 150 of the GNSS receiver 100 modifies at least one of the pseudo-range measurement and the Doppler measurement according to the GNSS differential correction data stored in the first storage unit 130.

Please note that the executing order of the steps in the flowchart 200 is merely an example rather than a restriction of the practical implementations.

Figure 3:
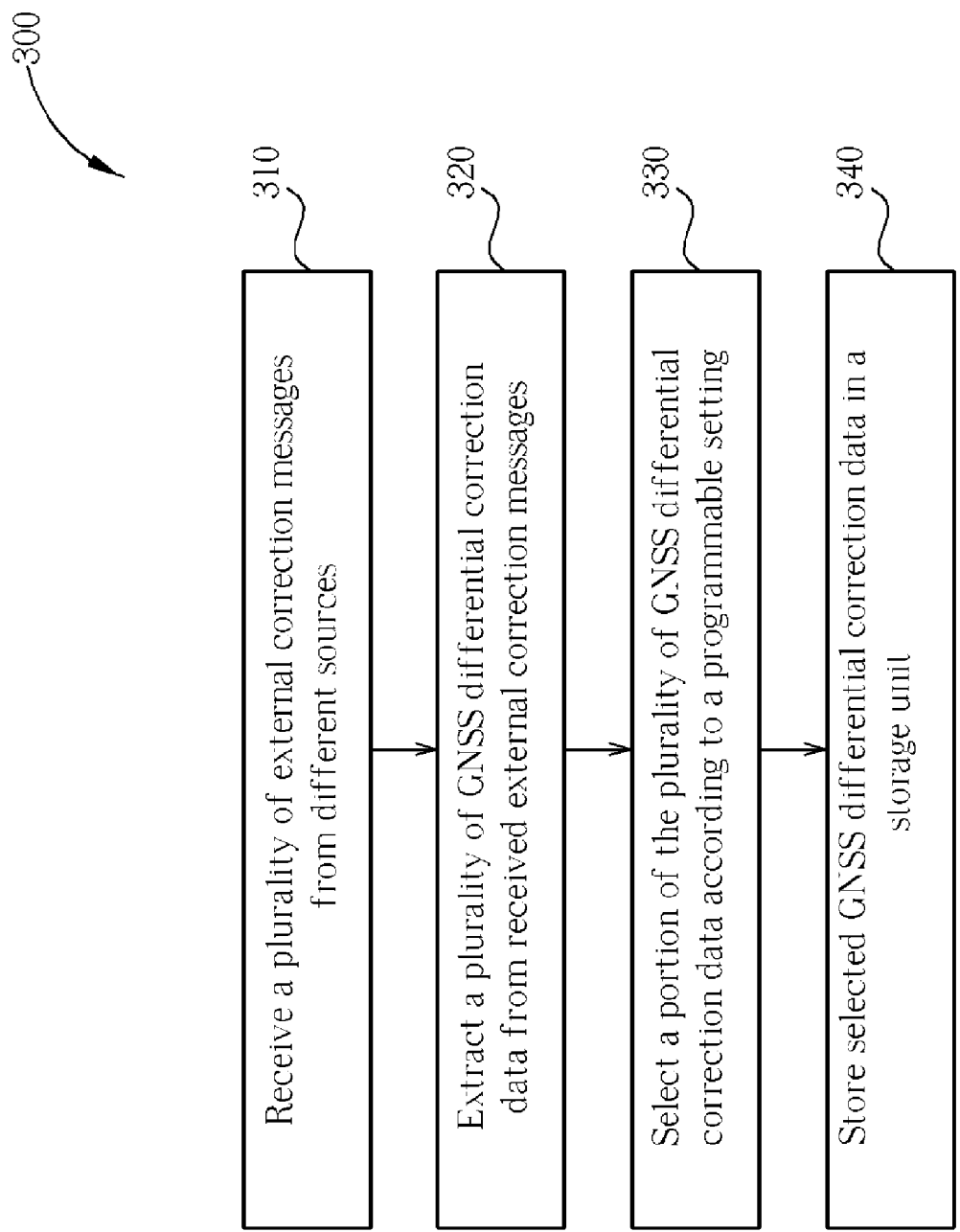
FIG. 3 is a flowchart illustrating a method for processing the external correction messages in the GNSS receiver of FIG. 1 according to a second embodiment of the present invention.

For example, FIG. 3 shows a flowchart 300 illustrating a method for processing the external correction messages in the GNSS receiver 100 according to a second embodiment of the present invention. Steps of the flowchart 300 are described below.

In step 310, the receiving module 110 receives a plurality of external correction messages from different sources, wherein a plurality of GNSS differential correction data of different types are carried by the plurality of external correction messages. Similar to the previous embodiment, the receiving module 110 receives SBAS messages, RTCM messages, and A-GPS messages from the SBAS satellite 104, the RTCM message source 106, and the cellular phone base station 108, respectively.

In step 320, the decision unit 120 extracts the plurality of GNSS differential correction data from the received SBAS messages, RTCM messages, and A-GPS messages.

In step 330, the decision unit 120 selects a portion of the plurality of GNSS differential correction data according to a programmable setting (not shown). Preferably, the decision unit 120 selects GNSS differential correction data that are derived from a predetermined data source (such as the SBAS satellite 104) in step 330. Similarly, the user of the GNSS receiver 100 is allowed to switch/select the source of GNSS differential correction data by changing the programmable setting.

In step 340, the decision unit 120 then stores the selected GNSS differential correction data in the first storage unit 130 while discarding the unselected GNSS differential correction data.

Once the selected GNSS differential correction data are stored in the first storage unit 130, the computing unit 150 modifies at least one of the pseudo-range measurement and the Doppler measurement according to the GNSS differential correction data stored in the first storage unit 130.

In practice, the decision unit 120 and the computing unit 150 can be realized by a same component, such as a microprocessor.

In contrast to the prior art, the disclosed GNSS receiver 100 and related methods can significantly reduce memory requirements while allowing the GNSS receiver 100 to support different data sources of GNSS differential correction data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing external correction messages in a GNSS receiver, comprising:
   providing a first storage unit;
   receiving a plurality of external correction messages from different data sources, wherein a plurality of GNSS differential correction data are carried by the plurality of external correction messages; and
   storing a portion of the GNSS differential correction data in the first storage unit without storing remaining GNSS differential correction data in the GNSS receiver.

2. The method of claim 1, wherein the plurality of external correction messages are selected from a group consisting of SBAS messages, RTCM messages, and A-GPS messages.

3. The method of claim 1, wherein the step of storing the portion of the GNSS differential correction data in the first storage unit comprises:
   selecting a portion of the plurality of external correction messages according to a programmable setting;
   extracting GNSS differential correction data from the selected external correction messages; and
   storing the GNSS differential correction data extracted from the selected external correction messages in the first storage unit while discarding GNSS differential correction data carried by other external correction messages.

4. The method of claim 3, wherein the selected external correction messages are derived from a predetermined data source.

5. The method of claim 1, wherein the step of storing the portion of the GNSS differential correction data in the first storage unit comprises:
   extracting the plurality of GNSS differential correction data from the plurality of external correction messages;
   selecting a portion of the plurality of GNSS differential correction data according to a programmable setting; and
   storing the selected GNSS differential correction data in the first storage unit while discarding unselected GNSS differential correction data.

6. The method of claim 5, wherein the selected GNSS differential correction data are derived from a predetermined data source.

7. The method of claim 1, wherein a capacity of the first storage unit is merely sufficient to store GNSS differential correction data derived from a predetermined data source, wherein the data amount of the GNSS differential correction data derived from the predetermined data source is greater than that derived from other data sources.

8. A GNSS receiver, comprising:
   a first storage unit;

a receiving module for receiving a plurality of external correction messages from different data sources, wherein a plurality of GNSS differential correction data are carried by the plurality of external correction messages; and a decision unit, coupled to the receiving module and the first storage unit, for storing a portion of the GNSS differential correction data in the first storage unit without storing remaining GNSS differential correction data in the GNSS receiver.

9. The GNSS receiver of claim 8, wherein the plurality of external correction messages are selected from a group consisting of SBAS messages, RTCM messages, and A-GPS messages.

10. The GNSS receiver of claim 8, wherein the decision unit selects a portion of the plurality of external correction messages according to a programmable setting; extracts GNSS differential correction data from the selected external correction messages; and stores the GNSS differential correction data extracted from the selected external correction messages in the first storage unit while discarding GNSS differential correction data carried by other external correction messages.

11. The GNSS receiver of claim 10, wherein the external correction messages selected by the decision unit are derived from a same data source.

12. The GNSS receiver of claim 8, wherein the decision unit extracts the plurality of GNSS differential correction data from the plurality of external correction messages; selects a portion of the plurality of GNSS differential correction data according to a programmable setting; and stores the selected GNSS differential correction data in the first storage unit while discarding unselected GNSS differential correction data.

13. The GNSS receiver of claim 12, wherein the GNSS differential correction data selected by the decision unit are derived from a same data source.

14. The GNSS receiver of claim 8, wherein a capacity of the first storage unit is merely sufficient to store GNSS differential correction data derived from a predetermined data source, wherein the data amount of the GNSS differential correction data derived from the predetermined data source is greater than that derived from other data sources.

15. The GNSS receiver of claim 8, further comprising:

a computing unit coupled to the first storage unit for modifying at least one of a pseudo-range measurement and a Doppler measurement of the GNSS receiver according to the GNSS differential correction data stored in the first storage unit.

16. A method for correcting position measurements of a GNSS receiver, comprising:

providing a first storage unit;

receiving a plurality of external correction messages from different data sources, wherein a plurality of GNSS differential correction data are carried by the plurality of external correction messages;

storing a portion of the GNSS differential correction data in the first storage unit without storing remaining GNSS differential correction data in the GNSS receiver; and modifying at least one of a pseudo-range measurement and a Doppler measurement of the GNSS receiver according to the GNSS differential correction data stored in the first storage unit.

17. The method of claim 16, wherein the plurality of external correction messages are selected from a group consisting of SBAS messages, RTCM messages, and A-GPS messages.

18. The method of claim 16, wherein the step of storing the portion of the GNSS differential correction data in the first storage unit comprises:

selecting a portion of the plurality of external correction messages according to a programmable setting;

extracting GNSS differential correction data from the selected external correction messages; and storing the GNSS differential correction data extracted from the selected external correction messages in the first storage unit while discarding GNSS differential correction data carried by other external correction messages.

19. The method of claim 18, wherein the selected external correction messages are derived from a same data source.

20. The method of claim 16, wherein the step of storing the portion of the GNSS differential correction data in the first storage unit comprises:

extracting the plurality of GNSS differential correction data from the plurality of external correction messages;

selecting a portion of the plurality of GNSS differential correction data according to a programmable setting; and storing the selected GNSS differential correction data in the first storage unit while discarding unselected GNSS differential correction data.

21. The method of claim 20, wherein the selected GNSS differential correction data are derived from a same data source.

22. The method of claim 16, wherein a capacity of the first storage unit is merely sufficient to store GNSS differential correction data derived from a predetermined data source, wherein the data amount of the GNSS differential correction data derived from the predetermined data source is greater than that derived from the other data sources.

23. A method for processing external correction messages in a GNSS receiver, comprising:

providing a first storage unit;

receiving a plurality of external correction messages from different data sources, wherein a plurality of GNSS differential correction data are carried by the plurality of external correction messages;

selecting a portion of the plurality of external correction messages according to a programmable setting;

extracting GNSS differential correction data from the selected external correction messages; and storing the GNSS differential correction data extracted from the selected external correction messages in the first storage unit while discarding GNSS differential correction data carried by other external correction messages.

24. The method of claim 23, wherein the plurality of external correction messages are selected from a group consisting of SBAS messages, RTCM messages, and A-GPS messages.

25. The method of claim 23, wherein the selected external correction messages are derived from a predetermined data source.

26. The method of claim 23, wherein a capacity of the first storage unit is merely sufficient to store GNSS differential correction data derived from a predetermined data source, wherein the data amount of the GNSS differential correction data derived from the predetermined data source is greater than that derived from other data sources.

27. A method for processing external correction messages in a GNSS receiver, comprising:

providing a first storage unit;

receiving a plurality of external correction messages from different data sources, wherein a plurality of GNSS differential correction data are carried by the plurality of external correction messages;

extracting the plurality of GNSS differential correction data from the plurality of external correction messages;

selecting a portion of the plurality of GNSS differential correction data according to a programmable setting; and storing the selected GNSS differential correction data in the first storage unit while discarding unselected GNSS differential correction data.

28. The method of claim 27, wherein the selected GNSS differential correction data are derived from a predetermined data source.

29. The method of claim 27, wherein a capacity of the first storage unit is merely sufficient to store GNSS differential correction data derived from a predetermined data source, wherein the data amount of the GNSS differential correction data derived from the predetermined data source is greater than that derived from other data sources.

30. The method of claim 27, wherein the plurality of external correction messages are selected from a group consisting of SBAS messages, RTCM messages, and A-GPS messages.

31. A GNSS receiver, comprising:
a first storage unit;
a receiving module for receiving a plurality of external correction messages from different data sources, wherein a plurality of GNSS differential correction data are carried by the plurality of external correction messages; and
a decision unit, coupled to the receiving module and the first storage unit, for storing a portion of the GNSS differential correction data in the first storage unit without storing remaining GNSS differential correction data in the GNSS receiver;
wherein the decision unit selects a portion of the plurality of external correction messages according to a programmable setting; extracts GNSS differential correction data from the selected external correction messages; and stores the GNSS differential correction data extracted from the selected external correction messages in the first storage unit while discarding GNSS differential correction data carried by other external correction messages.

32. The GNSS receiver of claim 31, wherein the external correction messages selected by the decision unit are derived from a same data source.

33. The GNSS receiver of claim 31, wherein the plurality of external correction messages are selected from a group consisting of SBAS messages, RTCM messages, and A-GPS messages.

34. The GNSS receiver of claim 31, wherein a capacity of the first storage unit is merely sufficient to store GNSS differential correction data derived from a predetermined data source, wherein the data amount of the GNSS differential correction data derived from the predetermined data source is greater than that derived from other data sources.

35. The GNSS receiver of claim 31, further comprising:
a computing unit coupled to the first storage unit for modifying at least one of a pseudo-range measurement and a Doppler measurement of the GNSS receiver according to the GNSS differential correction data stored in the first storage unit.

36. A GNSS receiver, comprising:
a first storage unit;
a receiving module for receiving a plurality of external correction messages from different data sources, wherein a plurality of GNSS differential correction data are carried by the plurality of external correction messages; and
a decision unit, coupled to the receiving module and the first storage unit, for storing a portion of the GNSS differential correction data in the first storage unit without storing remaining GNSS differential correction data in the GNSS receiver;
wherein the decision unit extracts the plurality of GNSS differential correction data from the plurality of external correction messages; selects a portion of the plurality of GNSS differential correction data according to a programmable setting; and stores the selected GNSS differential correction data in the first storage unit while discarding unselected GNSS differential correction data.

37. The GNSS receiver of claim 36, wherein the GNSS differential correction data selected by the decision unit are derived from a same data source.

38. The GNSS receiver of claim 36, wherein the plurality of external correction messages are selected from a group consisting of SBAS messages, RTCM messages, and A-GPS messages.

39. The GNSS receiver of claim 36, wherein a capacity of the first storage unit is merely sufficient to store GNSS differential correction data derived from a predetermined data source, wherein the data amount of the GNSS differential correction data derived from the predetermined data source is greater than that derived from other data sources.

40. The GNSS receiver of claim 36, further comprising:
a computing unit coupled to the first storage unit for modifying at least one of a pseudo-range measurement and a Doppler measurement of the GNSS receiver according to the GNSS differential correction data stored in the first storage unit.

* * * * *